US010015721B2

(12) United States Patent
Routt et al.

(10) Patent No.: US 10,015,721 B2
(45) Date of Patent: Jul. 3, 2018

(54) MOBILE APPLICATION TESTING ENGINE

(71) Applicant: AT&T Mobility II LLC, Atlanta, GA (US)

(72) Inventors: Thomas Routt, Edmonds, WA (US); Arturo Maria, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 14/885,279

(22) Filed: Oct. 16, 2015

(65) Prior Publication Data
US 2017/0111844 A1    Apr. 20, 2017

(51) Int. Cl.
*H04W 40/12* (2009.01)
*H04L 29/08* (2006.01)
*H04W 24/08* (2009.01)

(52) U.S. Cl.
CPC .......... *H04W 40/12* (2013.01); *H04L 69/326* (2013.01); *H04W 24/08* (2013.01)

(58) Field of Classification Search
CPC ......... G06F 17/27; H04L 67/22; H04L 41/16; H04L 43/04; H04L 43/08; H04L 43/16; H04L 65/80; H04L 69/326; H04W 24/10; H04W 28/18; H04W 4/003; H04W 40/12; H04W 24/02
USPC .............................................. 455/422.1, 445
See application file for complete search history.

(56) References Cited

U.S. PATENT DOCUMENTS

| 7,234,132 | B2 | 6/2007 | Lam |
| 7,339,891 | B2 | 3/2008 | Binder et al. |
| 8,744,431 | B2 | 6/2014 | Chiou et al. |
| 8,881,111 | B1 | 11/2014 | Smith et al. |

(Continued)

OTHER PUBLICATIONS

Wittie et al: "MIST: Cellular data network measurement for mobile applications", IEEE Fourth International Conference on Broadband Communications, Networks and Systems, Sep. 2007, 9 pages, hereinafter Wittie.*

(Continued)

*Primary Examiner* — Ronald Eisner
(74) *Attorney, Agent, or Firm* — Amin, Turocy & Watson, LLP

(57) ABSTRACT

Providing collection and storage of mobile application data associated with execution of a mobile application is disclosed for a carrier core-network connected component. In an aspect, the carrier core-network connected component can enable storage of some, none, or all mobile application data related to mobile application information traversing a carrier core-network comprising the carrier core-network connected component. Analysis of the mobile application data can provide insight into a characteristic, behavior, etc., associated with the mobile application. The analysis can enable adaptation of mobile application information transport topography, environment, etc., modification of the mobile application data, testing of mobile application performance related to mobile application information traversing the carrier core-network, simulations to test application services and/or mobile applications, etc. A carrier core-network is generally able to capture more mobile application data from more mobile devices, under more operating systems, and provide better access to collected data than conventional technologies.

20 Claims, 10 Drawing Sheets

(56) References Cited

U.S. PATENT DOCUMENTS

| | | | |
|---|---|---|---|
| 8,997,081 B1 | 3/2015 | Manion et al. | |
| 9,053,242 B2 | 6/2015 | Smith et al. | |
| 9,053,435 B2 | 6/2015 | Krukow et al. | |
| 9,147,201 B2* | 9/2015 | Crawford | H04L 67/24 |
| 2006/0159033 A1* | 7/2006 | Suzuki | H04L 45/00 |
| | | | 370/254 |
| 2008/0181117 A1* | 7/2008 | Acke | H04L 41/0896 |
| | | | 370/236.2 |
| 2009/0177567 A1 | 7/2009 | McKerlich et al. | |
| 2011/0310744 A1* | 12/2011 | Besset | H04L 41/0686 |
| | | | 370/241 |
| 2013/0286844 A1* | 10/2013 | Ishizuka | H04L 45/64 |
| | | | 370/235 |
| 2013/0326074 A1 | 12/2013 | He et al. | |
| 2014/0298297 A1 | 10/2014 | Prasad et al. | |
| 2014/0302837 A1 | 10/2014 | Ronen et al. | |
| 2015/0099493 A1 | 4/2015 | Mathur et al. | |
| 2015/0189552 A1* | 7/2015 | Cazanas | H04W 28/18 |
| | | | 709/227 |
| 2015/0358391 A1* | 12/2015 | Moon | H04L 67/10 |
| | | | 709/224 |

OTHER PUBLICATIONS

Wittie, et al. "MIST: Cellular data network measurement for mobile applications." IEEE Fourth International Conference on Broadband Communications, Networks and Systems, Sep. 2007. 9 pages.

* cited by examiner

MOBILE APPLICATION TESTING ENGINE

TECHNICAL FIELD

The disclosed subject matter relates to a mobile application testing engine, e.g., for analyzing data associated with a mobile application traversing a carrier core-network.

BACKGROUND

By way of brief background, conventional mobile application testing and mobile application data capture is generally performed at a device executing the mobile application or at a device executing an application service in support of the mobile application, e.g., at, or near, the endpoints of communication between the mobile application and the mobile application service. Even where mobile application testing and data capture is performed at devices other than a mobile executing a mobile application or at devices other than a device executing an application service, these conventional systems generally are engineered for a specific operating system, a specific mobile application, or a specific application service. Conventional systems are typically not well positioned for implementation in a carrier core-network environment and generally cannot capture data related to execution of a mobile application from a high percentage of mobile applications or their corresponding application services as they traverse a carrier core-network because they are not designed for, and thus cannot be implemented on, a carrier core-network.

DETAILED DESCRIPTION

Figure 1:
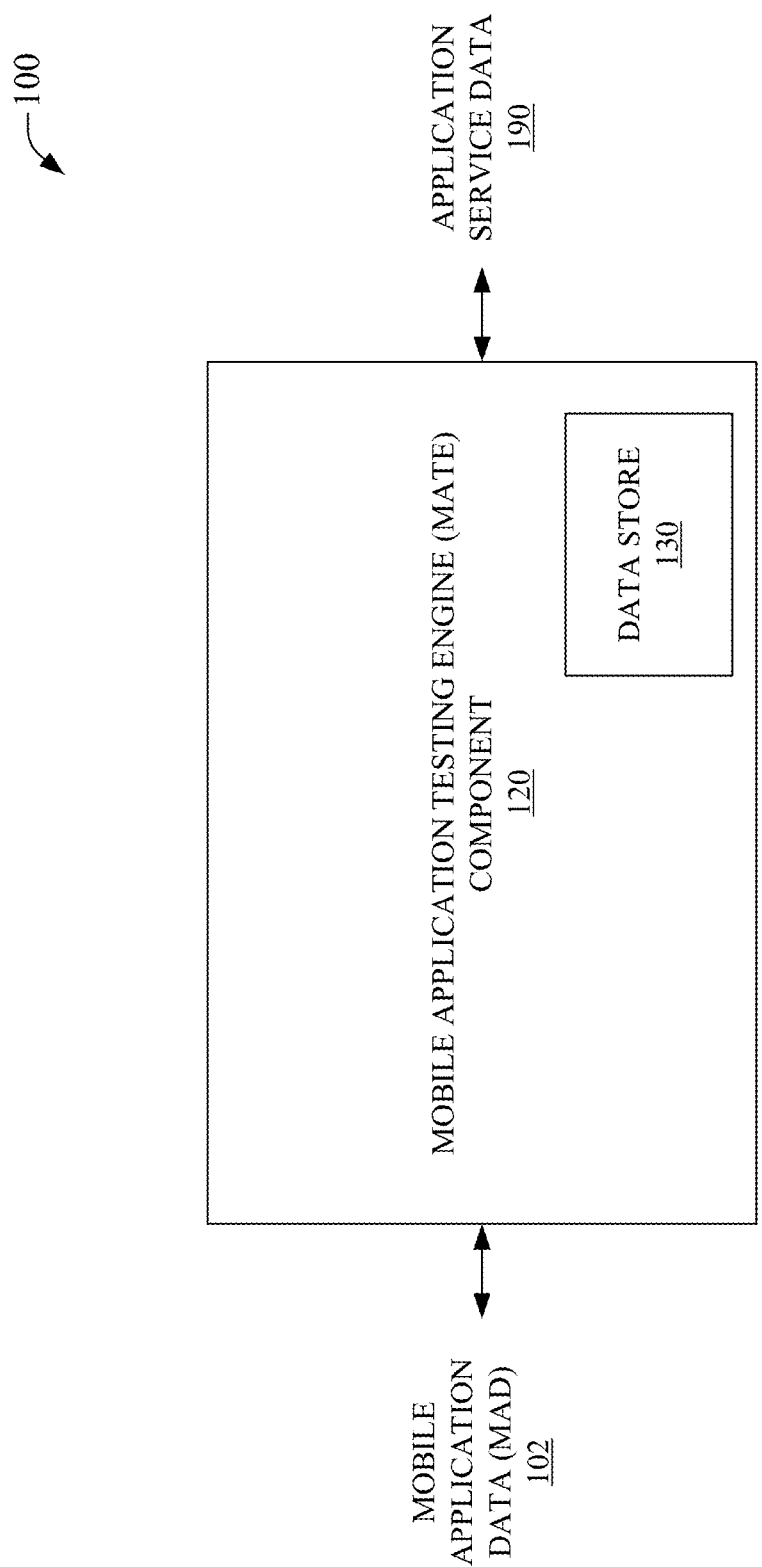
FIG. 1 is an illustration of an example system that facilitates mobile application testing and data capture in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional application testing generally relies on testing services located at endpoints in a testing system, e.g., at a mobile device, at a testing server, an application service device, etc., and employs a network simply for transporting data between those endpoints. In contrast, the presently disclosed subject matter relates to capturing data related to mobile applications, e.g., mobile application data (MAD) which, as used herein, is inclusive of data sent by a mobile application and data sent to a mobile application unless otherwise explicitly or implicitly stated as being otherwise, at a midpoint for performing testing or simulation on the data as it passes through a carrier core-network. The capture of this data, or the results of the tests and simulations, can be employed for adapting the mobile application, the data transport topology, the application service, etc., to adjust the performance of a mobile application environment, often in real time. Moreover, while conventional techniques can often be siloed and proprietary for each mobile application, mobile device, mobile operating system (OS), application service, etc., the disclosed subject matter allows for the capture of nearly any data related to the mobile application or application service transitioning the carrier core-network and can be agnostic with regard to mobile device type, OS, application service, mobile application, etc.

In addressing these and/or other issues, one or more embodiments of the subject application relate to a mobile application testing engine. For instance, one or more embodiments relate to data associated with a mobile application traversing a carrier core-network, e.g., capturing mobile application data sent to a mobile application service via a carrier core-network device, capturing application service data sent to a mobile application via a carrier core-network device, analysis of captured data, e.g., to determine trends, behaviors, characteristics, etc., to enable adapting a mobile application or parameter related thereto, adapting transport, deriving correlated information, e.g., big data analysis, etc., mobile application testing or simulation of supporting systems, etc., wherein a carrier is uniquely positioned to harvest the data associated with a mobile application traversing the carrier core-network from nearly any mobile application or application service executing in nearly any mobile operating system or application service operating system.

The instant subject matter enables capture of huge repositories of data related to a mobile application, which can be stored for data mining, testing, analysis, etc., to reveal characteristics, trends, behaviors, etc., related to a mobile application or support thereof. This can allow for implementation of services, provisioning of equipment, adaptation of topologies, etc., to alter the performance of a mobile application environment. As an example, monitoring and analyzing a repository of mobile application data can enable can reveal that during peak use periods latency increases are degrading the performance of a video chat application for mobile users in urban regions. In response to this information, the carrier core-network can be adapted to route video chat data through other low latency nodes during peak use periods for urban regions. As another example, analysis of data related to a mobile voice over internet protocol (VoIP) or voice over long term evolution (VoLTE) application can rank radio access networks (RANs) for different geographic areas by performance to enable updates to the RANs to be targeted to the those that would show the greatest improvement to users, e.g., older RAN equipment and software in a rural area may be ranked low for upgrading while an urban area with newer RAN equipment/software may be ranked at a middle priority and a suburban area with the similar RAN equipment/software can be ranked as high priority for an upgrade due to a disproportionate dropped call rate, that perhaps could be correlated to a surge in population of the suburban region, geography of the suburban region, etc. A carrier core-network centric mobile application testing engine (MATE) can provide unique advantages over conventional technologies because it can monitor nearly all traffic through the carrier level network in contrast to other technologies that may incidentally use a carrier core-network for transport but are typically restricted to monitoring data only at the endpoints because they generally do not have access to carrier level networks, e.g., carrier core-networks.

In an aspect, a carrier core-network, a central part of a telecommunications network for the carrier, e.g., a carrier entity, can provide various services to customers who are connected by an access network. As an example, a radio access network (RAN) can connect to a carrier core-network to support mobile devices connected to the RAN. A carrier core-network can comprise a component(s) related to establishing a connection with a device via an access network(s), a component(s) for transporting data or signals across the carrier core-network, a component(s) for allowing access to the transported data or signals to another component(s), etc. A carrier core-network can be connected to a component(s) outside the carrier core-network, for example, an internet node, an application service, a server, a data store, etc. Typically, the term 'carrier core-network' refers to high capacity communication facilities that connect primary nodes and provides paths for the exchange of information between different sub-networks. In enterprise level private networks, e.g., a proprietary corporate network, the term backbone is more commonly employed, while for service providers, e.g., wireless carriers, etc., the term core-network is more common. Core-networks can be linked by interexchange networks, e.g., within a nation-sized region, however, a core-network can be extended to encompass an entire region, e.g., extending to national or geographic boundaries. Most core-networks have a mesh topology that can provide m-to-m connections among devices on the network. Common devices and facilities of a core-network includes gateways, switches, routers, a home location register, a visitor location register, a mobile switching center, an equipment identity register, an authentication center, etc. An example a carrier core-network can comprise IS-41 systems, also known as ANSI-41 systems, an SS7 protocol, such as Mobile Application Part, etc., or other systems and technologies, to support mobile/cellular telecommunications and mobility management.

Furthermore, capture of mobile application data at the carrier level, e.g., as it is transported across a carrier core-network, can allow for data queries and data analysis by a wide array of entities, e.g., application developers, application service providers, government entities, advertising or marketing entities, network equipment/software manufacturers/developers, carriers, etc., subject to privacy policies and systems of a carrier implementing MATE technology. In some embodiments, entities can request an analysis to be performed on a stored MAD set, can request subsets of a stored MAD set, can request real-time feeds of MAD, can request best practices information based on carrier analysis of MAD, etc. As an example, a mobile application developer can be provided, in response to a request, information indicating that, for mobile applications located in Mexico, there is a lower latency associated with data moved through a U.S. network node than a local Mexican network node, which can be due to the example U.S. node having newer equipment/software than the Mexican node, allowing the developer to adapt the mobile application development to prefer U.S. network nodes to Mexican network nodes. As another example, in response to a query, an application service provider can be provided information that mobile application calls to a specific port are failing at a higher rate that calls to other ports of the application service, which can allow the provider to take corrective action with regard to the suspect port. As a further example, a carrier can publish best practices that can comprise information indicating relative latency, throughput, and availability, for NodeB nodes as compared to Wi-Fi nodes, which can allow the mobile industry to incorporate this data into development of products or updates to existing products, by standards setting organizations in rolling out or updating policies, etc. As will be appreciated by those of skill in the art, MAD data sets can be expected to be significantly larger and more comprehensive than testing data from conventional technologies, in part due to the carrier-centric nature of MATE technologies as disclosed herein. It is further noted that large scale data analysis, e.g., data mining, can provide a vast array of information, all of which is to be considered within the scope of the instant disclosure even where not explicitly recited for the sake of clarity and brevity.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates mobile application testing and data capture in accordance with aspects of the subject disclosure. System 100 can comprise mobile application testing engine (MATE) component 120 that can receive and pass mobile application data (MAD) 102 and application service data 190. MATE component 120 can comprise data store 130 to enable storage of data related to monitoring MAD 102 and application service data 190 as it transits through a carrier core-network component, not illustrated. MATE component 120 can duplicate MAD 102, application service data 190, RAN information, core-network information, etc., and can store some, none, or all, of the duplicated data, e.g., at data store 130. Given that MATE technology can enable massive stores of data related to a mobile application, generally all, or nearly all, duplicated data can be stored. However, in some circumstances, duplication of data, or storage thereof, can be undesirable or prohibited, in which situations, less than all of the MAD 102 or application service data 190 can be duplicated and/or stored. As an example, privacy constraints can be applied to avoid duplication of, or removing, personal identifiers, content, etc. As another example, information subject to governmental interests, international treaties, etc., can be ignored. As a further example, some cyberattacks, such as a denial of service attack, can flood a network with atypical data that can be, in some instances, ignored by MATE technology.

MATE component 120 can capture behavior and behavior patterns of mobile applications and store these captured mobile application behaviors or patterns in a knowledge database, e.g., based on data stored at data store 130, etc. A carrier has a unique advantage in that it can, for example, inspect headers, etc., as data flows through a carrier's core-network and determine the behavior of all, or in some instances some or none, of the mobile application behaviors before they leave or return through the carrier network to/from the Internet or application servers, etc. In an embodiment, MATE component 120, e.g., via data store 130, can provide mobile application usage and validated data to big data analytics engines. In some embodiments, MATE component 120 can perform tests or analysis on captured data, test or simulate a condition with a mobile application in execution, or test/simulate an interaction with an applications service in execution, etc., for example, testing geographic functionality among a plurality of captured geo-tagged location-based services and mapping mobile application data, providing functional testing of captured/stored mobile application data, utilizing test data to validate mobile application functionality, utilizing captured/tested data to validate new releases of mobile applications based on previous mobile application functionality, test the security of mobile applications, etc.

In some embodiments, MATE component 120 can be implemented as a front-end, e.g., to LTE Gateways, to 3G GGSN Gateway, as a front end processor, as a software-defined network element, etc. In other embodiments, MATE component 120 can be implemented as a cloud network component that can reside in the cloud and access mobile applications through an interface with the carrier core-network. Information generated by MATE component 120, where a carrier has a large geographic footprint, e.g., a worldwide carrier, can be unique from data captured from conventional technologies that are not able to capture, process, analyze, curate, store, search, and re-target mobile application functional, geo-tagged, release-fit, security data, etc., where a conventional technology is not designed for use on a large carrier level scale.

It is envisioned that the MATE component 120 can provide a central point of integration among a plurality of mobile applications through a single carrier core-network, e.g., an LTE Gateway, etc., or through a plurality of carrier core-networks, e.g., multiple LTE Gateways, etc. Further, MATE component 120, can provide a central point of integration among a plurality of mobile applications through a software-defined element as a functional superset of a carrier core-network systems, e.g., a Commercial Connectivity Service (CCS) LTE Gateway, a plurality of carrier core-network CCS LTE Gateways, etc. Similarly, MATE component 120 can provide a central point of integration among a plurality of mobile applications through a carrier core-network 3G GGSN Gateway, through a plurality of carrier core-network 3G GGSN Gateways, etc. As such, MATE component 120 can provide a central point of integration among a plurality of mobile applications and mobile devices, including IPdata originating from SS7 packets, short message service (SMS) data, multimedia messaging service (MMS) data, location-based services and GPS coordinate-based data, for optimization of Quality of Service (QoS) on demand, etc.

Moreover, analysis of data captured/stored by MATE component 120 can provide a central point of dynamic, software-defined management, control and provisioning functions for and among a plurality of mobile applications and mobile devices. In an aspect, data analysis that captures mobile application behaviors, etc., can allow adaptation of the carrier core-network or components thereof, a RAN or components thereof, a mobile device executing the mobile application, an application service or components executing the application service, etc. As such, MATE component 120 can provide a central point of dynamic, software-defined management, control and provisioning functionality for, and among, a plurality of carrier-based core-network component; a central point of dynamic, software-based surveillance and on-demand QoS awareness and optimization for, and among, a plurality of mobile applications and mobile devices; a central point of dynamic, software-based, optimized data-centric, hierarchical, and location-based medium access control and routing functions among a plurality of mobile applications and mobile devices, a central point of continuous, event-driven, query-driven, and hybrid data acquisition and delivery models on behalf of and among a plurality of mobile applications and mobile devices; a central point of data correlation on behalf of and among a plurality of mobile applications and mobile devices; etc.

MATE component 120, in some embodiments, can correlate mobile application and mobile device management data to redirect correlated data to specific customer enterprise networks. For example, data from a plurality of mobile applications and mobile devices can be correlated into a data record, or a plurality of integrated records, and then routed via an LTE Gateway or 3G GGSN carrier core-network gateway to one or a plurality of enterprise servers, data repositories can be accessed by Big Data Analytics Engines, such as carrier-resident Big Data Analytics Engines, or customer premise-resident Big Data applications, targeted to MATE data repositories, etc. In an aspect, a MATE appliance, for example, mate appliance 422, can reside in the customer enterprise network and can interface closely with a carrier MATE component, e.g., MATE component 120, 420, etc. In an aspect, a MATE appliance can receive integrated and correlated records, and communicate with the carrier core-network MATE component, e.g., MATE component 120, 420, etc., in a secure manner in order to request further information, to receive data analytics, etc., where the MATE component can collect and correlate mobile app and mobile device data, store these data in extremely large data repositories that reside either within the carrier network or in the cloud, etc.

In some embodiments, MATE component 120 can provide a central point of dynamically allocated security protocols among a plurality of mobile apps and mobile devices through use of data-centric routing of metadata exchanged among a plurality of constituent MATE aggregation nodes, e.g., MATE appliance(s) such as 221, 421, 422, etc. This can enable data aggregation and data fusion among a plurality of mobile applications and mobile devices by dynamically optimizing among a plurality of signal processing and beamforming combinatorial techniques.

Further, in certain embodiments, MATE component 120 can provide low-level application programming interfaces (LLAPIs) between internal MATE components and subcomponents. Similarly, some embodiments can provide high-level application programming interfaces (HLAPIs) to external, non-MATE software-defined components.

Of note, mobile application data 102 can be related to application service data 190. In some embodiments, MAD 102 and application service data 190 can be the same. As an example, where MATE component 120 only copies data sent from and to a mobile application, MAD 102 and application service data 190 can be the same because they represent the data from/to the mobile application, e.g., data passed through the carrier core-network component(s) that is merely copied to data store 130. In other embodiments, MAD 102 and application service data 190 can be different. As an example, where MATE component 120 copies the data and also alters the data flow between the mobile application and an application service, such as by injecting or removing data as part of a test, interrupting the flow of data and substituting other data as part of a simulation, etc. This can be illustrated by MATE component 120 substituting simulated application service data in place of application service data 190 for an interaction with a mobile application sending/receiving MAD 102, for example to examine mobile application behaviors related to the substituted simulation application service data. This can allow an application service provider to test alternative embodiments of an application service. Similarly, as an example, MATE component 120 can interrupt at least a portion of MAD 102, substitute simulated MAD, etc., for interactions with an application service component associated with application service data 190 to test or simulate situation related to the behavior of the application service. As an example, MAD 102 can be interrupted and routed through another set of network nodes, such as employing nodes in foreign countries, employing deployed test nodes, employing simulated test nodes, etc., to examine the application service response via application service data 190, in which case, MAD 102 can be different from application service data 190 because of the MATE component 120 alteration(s), such as altered headers, altered latency, altered throughput, etc. Thus, wherein MAD 102 can comprise data sent from a mobile application and data sent to a mobile application, and similarly, application service data 190 can comprises data sent from a mobile application and data sent to a mobile application, these data can be the same where MATE component 120 does not alter them, e.g., only a copy is made, they are passed without any interaction, etc., or they can be different where MATE component 120 alters the data or conditions for traversing between the application service component and the mobile device.

Figure 2:
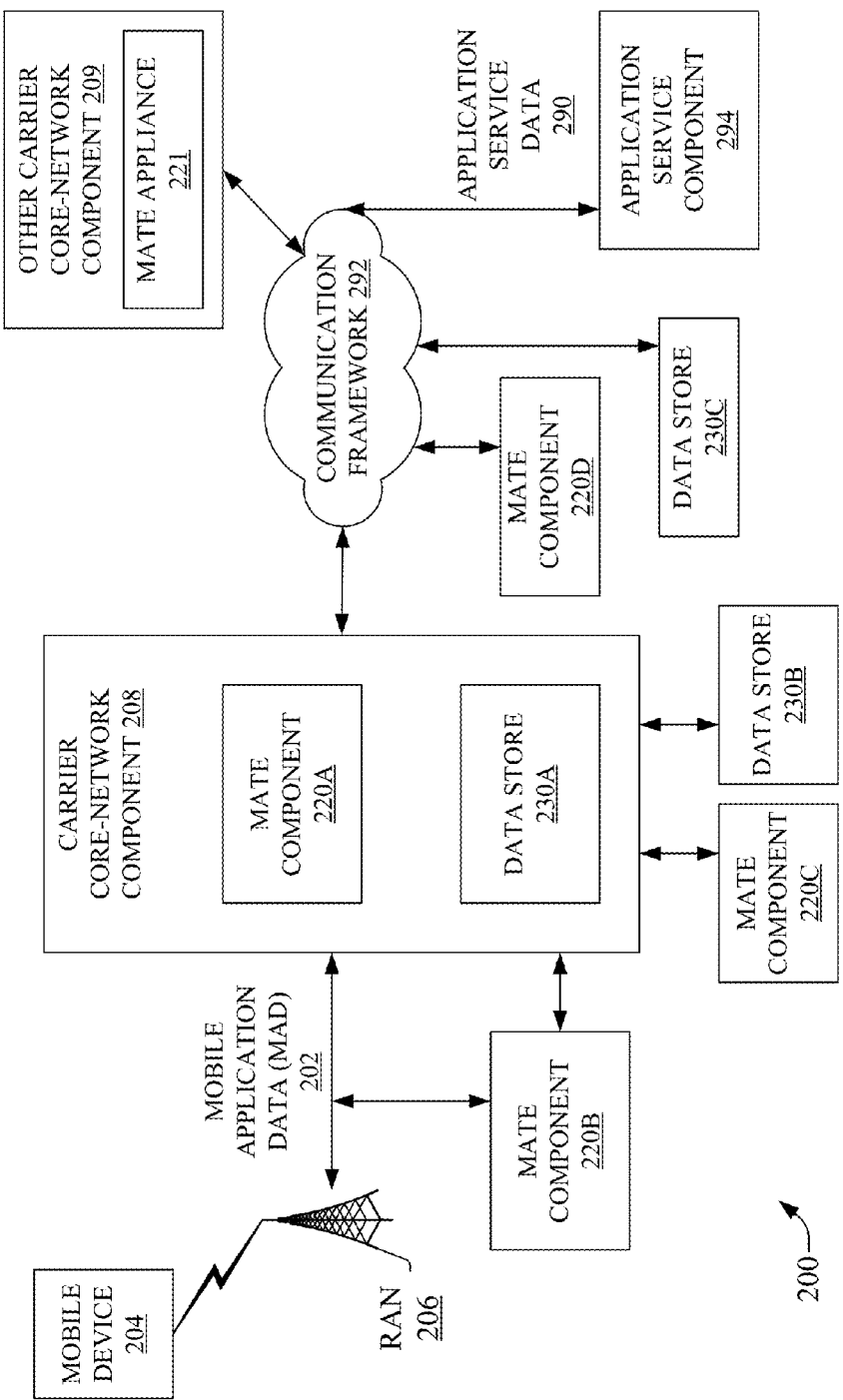
FIG. 2 is a depiction of an example system that facilitates mobile application testing and data capture at a carrier core-network component in accordance with aspects of the subject disclosure.

FIG. 2 is a depiction of a system 200 that can facilitate mobile application testing and data capture at a carrier core-network component in accordance with aspects of the subject disclosure. System 200 can comprise carrier core-network component 208 that can comprise MATE component 220A and data store 230A. In an embodiment, carrier core-network component 208 can be a gateway device, such as an LTE gateway, 3GPP gateway, etc. In other embodiments, carrier core-network device can be another component of the core-network of the carrier, meaning that it can be embodied in a device that is not part of mobile device 204, RAN 206, or application service component 294, e.g., a device of the central part of a telecommunications network associated with a carrier, for example, gateways, switches, routers, a home location register, a visitor location register, a mobile switching center, an equipment identity register, an authentication center, etc. Carrier core-network component 208 can, in some embodiments, be a component involved in transport of MAD 202 to/from mobile device 204 via RAN 206. As previously noted, in some instances MAD 202 can be the same as application service data 290, while in other instances, MAD 202 can be different from application service data 290, e.g., in instances where MAD 202 is altered as part of testing/simulation, transport, filtering, etc.

MATE component 220A can duplicate MAD 202, application service data 290, RAN information from RAN 206, core-network information, etc., and can store some, none, or all, of the duplicated data, e.g., at data store 230A. MATE technology can enable massive stores of data related to a mobile application, generally all, or nearly all, duplicated data can be stored. However, in some circumstances, duplication of data, or storage thereof, can be undesirable or prohibited, in which situations, less than all of the MAD 202 or application service data 290 can be duplicated and/or stored.

MATE component 220A can capture behavior and behavior patterns of mobile applications and store these captured mobile application behaviors or patterns in a knowledge database, e.g., based on data stored at data store 230A, etc. A carrier has a unique advantage in that it can, for example, inspect headers, etc., as data flows through a carrier's core-network and determine the behavior of all, or in some instances some or none, of the mobile application behaviors before they leave or return through the carrier network to/from communication framework 292 or application service component 294, etc. In an embodiment, MATE component 220A, e.g., via data store 230A, can provide mobile application usage and validated data to big data analytics engines. In some embodiments, MATE component 220A can perform tests or analysis on captured data, test or simulate a condition with a mobile application in execution, or test/simulate an interaction with an applications service in execution, etc.

System 200 further illustrates alternate and/or supplemental locations of MATE component 220A. In an embodiment, MATE component 220a can be supplemented or replaced by a MATE component in another location that is communicatively coupled to carrier core-network component 208, e.g., MATE component 220B-D. MATE Component 220B can be communicatively coupled to, but located external to, carrier core-network component 208 and can receive/send MAD 202, and/or application serviced data 290, via a connection with the data flows between RAN 206 and carrier core-network component 208. In some embodiments, MATE component 220C can be similar to MATE component 220B but can receive MAD 202 and/or application service data 290 via carrier core-network component 208 rather than from a connection between RAN 206 and carrier core-network component 208. In another embodiment, MATE component 220D can be similar to 220B and/or 220C, but can be have a communicative coupling with carrier core-network component 208 via communication framework 292. In some embodiments, MATE component 220D can be embodied as a cloud-based component. Similarly, a data store for storing MAD 202 and/or application service data 290, can be located within carrier core-network component 208, e.g., data store 230A, can be located locally but external to carrier core-network component 208, e.g., data store 230B, can be located remote from carrier core-network component 208, e.g., data store 230C, etc. Data store, e.g., 230A-C can send/receive data to/from MATE component, e.g., 220A-D, via one or more communicative links.

In an aspect, MAD 202, and/or application service data 290, can be received by and/or sent from a MATE component, e.g., 220A-D, in communication with carrier core-network component 208. MAD 202 and/or application service data 290 can be stored, in whole or in part, at a data store, e.g., data store 230A-C, in communication with carrier core-network component 208. The stored data can be analyzed to facilitate determining a behavior, a trend, a characteristic, etc., relating to a mobile application.

In an embodiment, system 200 can comprise other carrier core-network component 209 that can be part of a core-network associated with another carrier entity, with another core-network of the same carrier entity, etc. As an example, a wireless carrier can have more than one core-network, such as in nation-sized geographic regions, etc., and carrier core-network component 208 can be communicatively coupled with other carrier core-network component 209 in a manner that enables sharing of data between MATE component 220A and MATE appliance 221. In an embodiment, MATE appliance 221 can minor a MATE component, e.g., 220A-D. In another embodiment, MATE appliance 221 can share some, none, or all information with a MATE component, e.g., 220A-D, e.g., via a query-response protocol, via a push protocol, via a pull protocol, etc. As such, MATE appliance 221 can perform analysis on data captured by a MATE component, e.g., 220A-D, manage and respond to queries regarding MATE information, etc. In some embodiments, MATE appliance 221 can be located at a carrier core-network associated with a different carrier. In still other embodiments, MATE appliance 221 can be located an enterprise level core network for a private network or corporate network, though this is not illustrated for the sake of simplicity.

System 200 illustrates the flexible placement of a MATE component, e.g., 220A-D, and the related data store, e.g., 230A-C, in relation to carrier core-network component 208. It will be noted that a MATE component, e.g., 220A-D, can be hardware, software, virtualized, or cloud-based, as will be readily appreciated by one of ordinary skill in the relevant art, however, unlike conventional technologies, MATE component 220A-D has an inherent distinction in that it can capture, by being associated directly with a carrier, data associated with a mobile application as it transitions the carrier core-network. This advantage will typically allow more data for more mobile applications to be captured than other conventional technologies. Moreover, analysis of the data can enable adaptation of data transport readily because of the close integration between MATE component 220A-D and carrier core-network component 208, which is an aspect not typically available in conventional mobile application testing systems.

Figure 3:
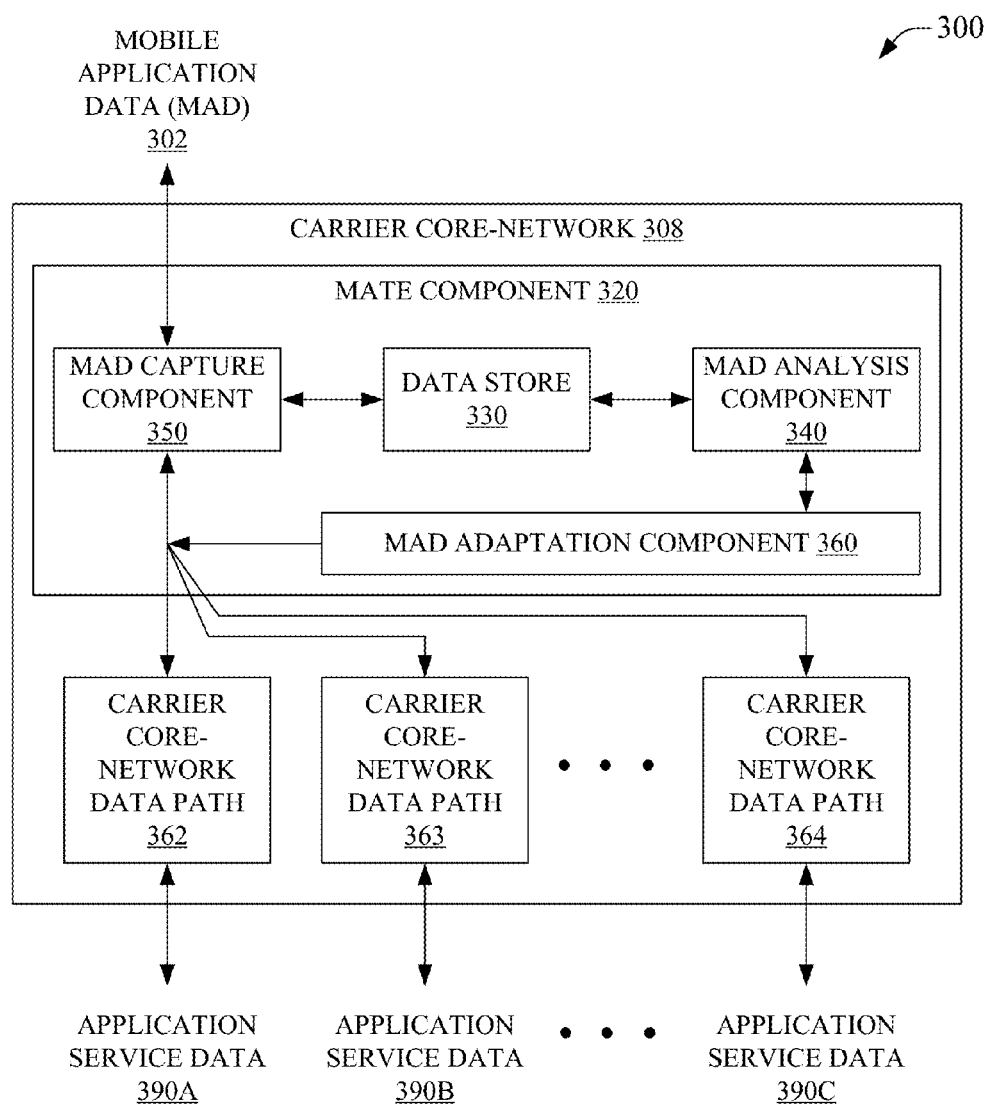
FIG. 3 illustrates an example system that facilitates mobile application testing and data capture to support adaptation of data transport in accordance with aspects of the subject disclosure.

FIG. 3 illustrates a system 300 that facilitates mobile application testing and data capture to support adaptation of data transport in accordance with aspects of the subject disclosure. System 300 can comprise carrier core-network component 308. Carrier core-network component 308 can comprise MATE component 320, which can receive MAD 302. MATE component 320 can comprise MAD capture component 350. MAD capture component 350 can capture MAD 302 for storage on data store 330.

MAD analysis component 340 can access MAD information stored on data store 330. In an aspect, MAD analysis component 340 can perform analysis on MAD 302 or related information, e.g., MAD information stored on data store 330, carrier network topology information, carrier network performance information, etc. MAD 302 can comprise user information, data size/volume information, application version information, latency information, QOS information, duration information, key performance indicator (KPI) information, geographic or location information, called application information, routing information, temporal information, device type information, OS information, or nearly any other type of information related to execution of a mobile application, transport of data related to the mobile application, or devices associated with the mobile application. In some embodiments, supplementary information can be collected from other components, e.g., data related to transport of mobile application data 302 and/or application service data via carrier network devices, data related to services or components accessed outside of the carrier network, etc. MAD analysis component 340 can determine characteristics, behaviors, trends, or predictions related to performance of a mobile application, transport of MAD 302 and/or application service data, etc.

In some embodiments, MAD analysis component 340 can test mobile applications, such as by altering MAD 302 to change routing, alter latency, alter accessibility to services, alter throughput, altering data in an attempt to cause errors/failures, e.g., fuzzing of MAD 302 and/or application service data, etc. In other embodiments, MAD analysis component 340 can disrupt the interaction between a mobile application in execution and an application service as part of simulating test conditions. This can allow MAD analysis component 340 to act as a simulated application service to test a mobile application in execution and/or can enable MAD analysis component 340 to act as a simulated mobile application in execution to test an application service.

MATE component 320 can further comprise MAD adaptation component 360 that can access an analysis/test/simulation performed by MAD analysis component 340. MAD adaptation component 360 can interact with a carrier network to alter conditions related to the transport and management of MAD 302 and/or application service data. As illustrated in system 300, MAD adaptation component 360 can alter the flow of MAD 302 causing it to flow via different carrier network paths, e.g., carrier core-network data path 362, 363, 364, etc. This adaptation of the carrier network can cause MAD 302 to flow to and from different instances of an application service, e.g., as application service data 390A-C, etc. In an aspect, application service data 390A can be located in a different location, on a different component, in a different software environment, in a different application provider entity device, etc., than application service data 390B, which in turn can be different from application service data 390C. As an example, application service data 390A can be located on a first generation server located in the U.S., application service data 390B can be located on a first generation server located in Canada, and application service data 390C can be located on a third generation server executing a beta version of a software environment and be located in Canada. In this example, MAD adaptation component 360 can cause MAD 302 to be routed to one or more of the application services associated with application service data 390A-C to test the effects of the different geographical locations, the different hardware, the different software, etc. Of note, other parameters, characteristics, or behaviors can be interrogated in a similar manner, all of which are considered within the scope of the present disclosure even where not explicitly recited for the sake of clarity and brevity.

Figure 4:
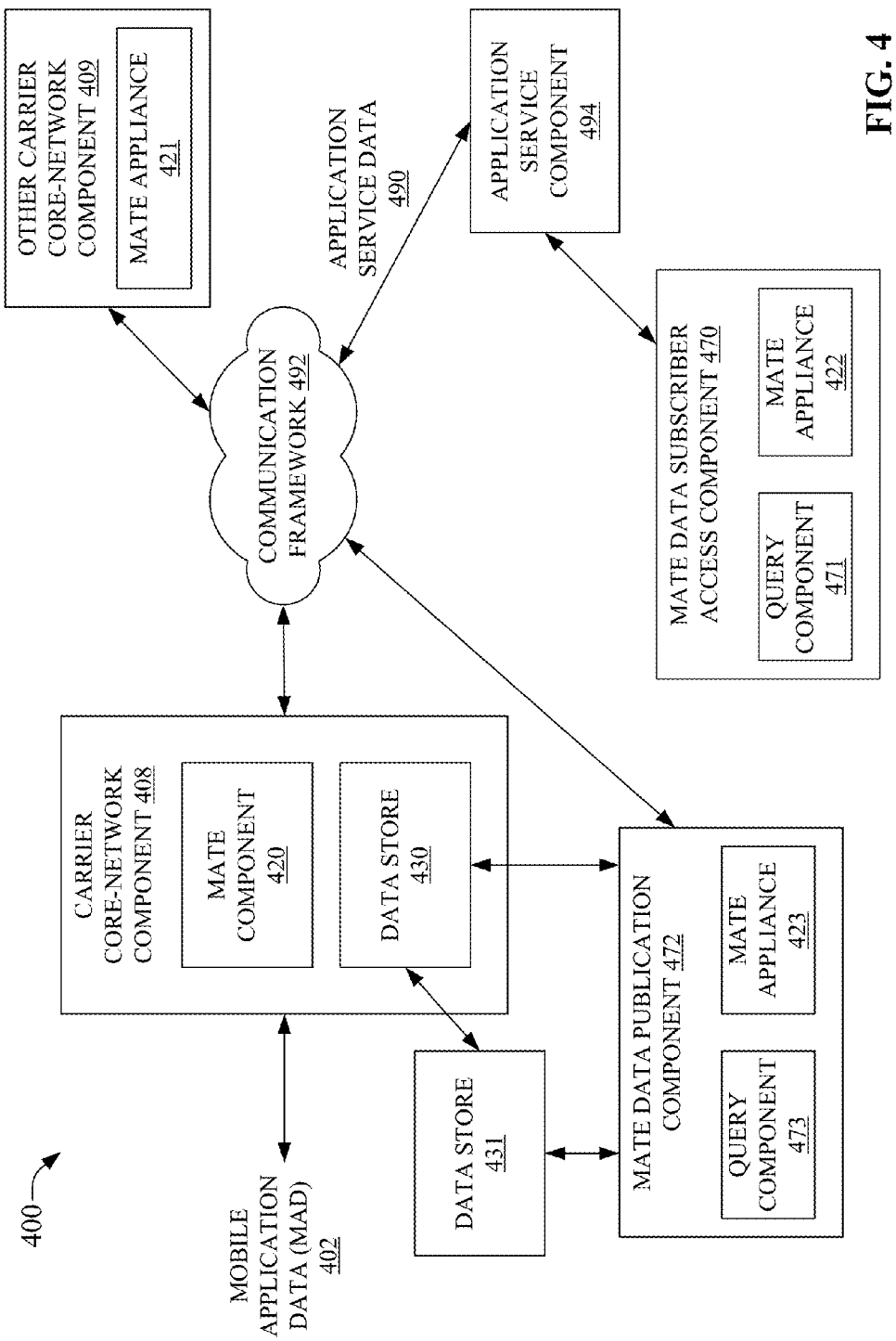
FIG. 4 illustrates an example system that facilitates mobile application testing and data capture via components at various network locations in accordance with aspects of the subject disclosure.

FIG. 4 illustrates a system 400 that facilitates mobile application testing and data capture via components at various network locations in accordance with aspects of the subject disclosure. System 400 can comprise a carrier core-network component 408 that can comprise MATE component 420 and data store 430. MATE component 420 can receive MAD 402 via carrier core-network component 408 and can store a facsimile of MAD 302 or related information at data store 430. MAD 402 can be passed via communication framework 492 to application service component 494 and data, e.g., application service data 490, can flow back to the mobile application from application service component 494.

System 400 can further comprise MATE appliance 421 that can be part of another carrier core-network component 409. MATE appliance 421 can interact with MATE component 420 and data store 430 via communication framework 492 and carrier core-network component 408 to enable access to MATE information, e.g., MAD 402, results of analysis of MAD 402, testing or simulation results related to MAD 402, etc. In some aspects, other carrier core-network component 409 can be associated with another carrier, an enterprise network, another branch of the same carrier, etc.

System 400 can further comprise MATE appliance 422 that can be part of MATE data subscriber access component 470. MATE data subscriber access component 470 can further comprise query component 471 that can cause queries of MATE information, e.g., MAD 402, results of analysis of MAD 402, testing or simulation results related to MAD 402, etc., via application service component 494, communication framework 492, and carrier core-network component 408. MATE appliance 422 can interact with MATE component 420 and data store 430 to enable access to MATE information, e.g., MAD 402, results of analysis of MAD 402, testing or simulation results related to MAD 402, etc., in relation to queries caused by query component 471. In an aspect, MATE data subscriber access component 470 can be associated with an application service provider, e.g., via application service component 494, which can be a MATE data subscriber, e.g., the application service provider can subscribe to MATE data and be allowed to query MATE information. Subscription to MATE information can be governed by a subscriber agreement, e.g., detailing what MATE information can be accessed/queried, levels of granularity, such as single mobile application in execution data, agglomerated mobile application in execution information, market trends, competing product behavior/statistics, etc.

In some embodiments, system 400 can comprise MATE appliance 423 that can be part of MATE data publication component 472. MATE data publication component 472 can further comprise query component 473 that can cause queries of MATE information, e.g., MAD 402, results of analysis of MAD 402, testing or simulation results related to MAD 402, etc., via communication framework 492 and carrier core-network component 408. MATE appliance 423 can interact with MATE component 420 and data store 430 to enable access to MATE information, e.g., MAD 402, results of analysis of MAD 402, testing or simulation results related to MAD 402, etc., in relation to queries caused by query component 473. In an aspect, MATE data publication component 472 can enable access to MATE information on an ad hoc basis. This access to MATE information can be governed by a use agreement, e.g., detailing what MATE information can be accessed/queried, levels of granularity, such as single mobile application in execution data, agglomerated mobile application in execution information, market trends, product behavior/statistics for various application services and/or mobile applications found in the market, etc. In an embodiment, MATE data publication component 472 can act as a portal to allow external users access to MATE information, subject to rules related to privacy, protection of proprietary information, etc. As an example, a university researcher can query MATE information to discover information/behaviors related to a comparison of carrier core-network latency, hop count, etc., for MAD 402 originating in Oklahoma in comparison to MAD 402 originating in New York. Similar examples are readily appreciated for comparing U.S. core-networks with Asian core-networks or African core-networks, etc. Further examples can comprise access to MATE information for the same region but for different carriers. Still other examples can comprise access to MATE information related to different hardware/software environments, different transport topologies, different mobile devices, different mobile device operating systems, different application server types, etc., all of which are considered within the scope of the instant disclosure though not further discussed for the sake of clarity and brevity. In an aspect, MATE data publication component 472 can be linked to data store 431 to enable MATE information to be copied from data store 430 to data store 431 in relation to a query of MATE information, to allow saving of an external analysis to data store 431, to allow storage of query arguments for later use, etc.

Figure 5:
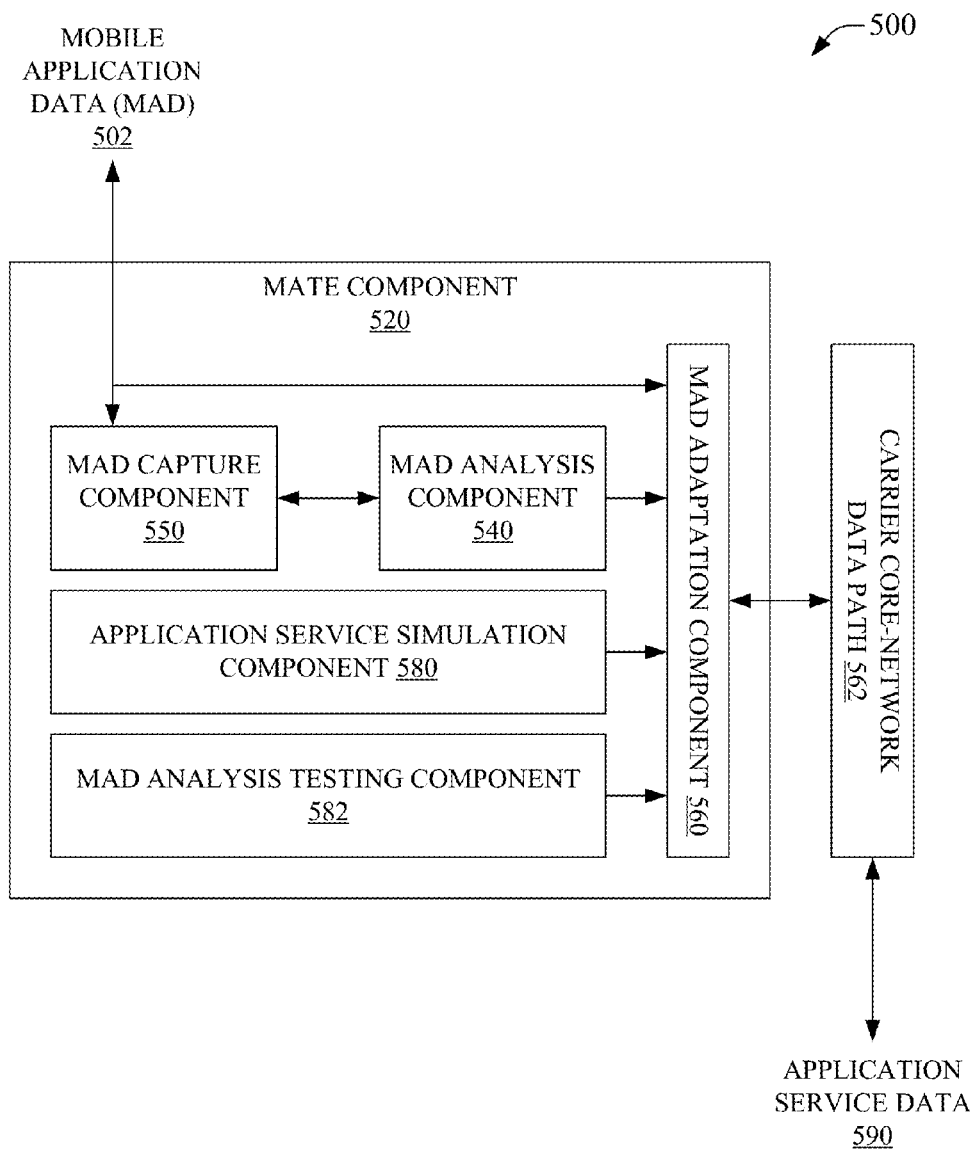
FIG. 5 illustrates an example system depicting mobile application testing and simulation supporting adaptation of data transport in accordance with aspects of the subject disclosure.

FIG. 5 illustrates a system 500 that facilitates mobile application testing and simulation supporting adaptation of data in accordance with aspects of the subject disclosure. System 500 can comprise MATE component 520 that can access and/or return MAD 502. MATE component 520 can comprise MAD capture component 550 that can copy MAD 302 flowing from or to a mobile application, e.g., to or form an application service. Captured MAD 502 and supplementary information relating to transport of MAD 502, carrier network topology or other KPIs or conditions, application service component information, etc., collectively MATE information, can be made accessible to MAD analysis component 540. MAD analysis component 540 can analyze MATE information. MAD adaptation component 560 can adapt MAD 502, an environment related to MAD 502, transport of MAD 502, etc., in response to the analysis performed by MAD analysis component 540. This adaptation can be made to carrier core-network data path 562 to cause changes to MAD 502 as it is passed to an application service and/or can cause changes to application service data 590 as it is returned via carrier core-network data path 562. As an example, MAD analysis component 540 can determine that streaming video data comprised in MAD 502 can experience lower latency by employing a particular path between the mobile device and a streaming video service provider component, and can instruct carrier core-network data path 562 to be adapted to provide the particular path to reduce said latency. In an embodiment, MATE component 520 can employ continuously variable machine logic, to facilitate adaptation of MAD 502 and/or application service data 590, e.g., via an analysis performed by MAD analysis component 540, etc. In an aspect, continuously variable machine logic can be a form of machine learning that can allow programming to be self-updated in real time based on logical rules. Continuously variable machine logic can enable a system or component to self-update programing based on changes experienced by the system or component.

MATE component 520 can further comprise application service simulation component 580 that can interrupt flow of MAD 502 from a mobile application in execution to an application service component and substitute data simulating the mobile application in execution to allow for testing of the application service and/or application service component. In some embodiments, the simulation can be based on MAD 502. In other embodiments, the simulation can be based on a simulation profile, etc. As an example, a VoLTE application service can be tested by simulating a VoLTE mobile application in execution at application service simulation component 580. The simulation can be an engineered simulation profile or can be based on MAD 502 from a real VoLTE mobile application in execution that has been altered to interrogate aspects of the VoLTE application service. The simulation can fuzz VoLTE data comprised in MAD 502, can present simulation data via different transport paths, can introduce artificial latency, availability, or throughput constraints, etc.

In some embodiments, MATE component 520 can comprise MAD analysis testing component 582 that can interrupt flow of application service data 590 from an application service and substitute data simulating the application service interacting with a mobile application in execution associated with MAD 502 to allow for testing of the mobile application and/or mobile device environment. In some embodiments, the MAD analysis testing can be based on application service data 590. In other embodiments, the MAD analysis testing can be based on an engineered testing profile, etc. As an example, a mobile mapping application can be tested by simulating a mapping application service. The simulation can be an engineered testing profile or can be based on application service data 590 from a real mapping application service that has been altered to test aspects of the mobile mapping application in execution. The testing can fuzz mapping service data comprised in application service data 590, can present testing data via different transport paths, can introduce artificial latency, availability, or throughput constraints, etc.

Figure 6:
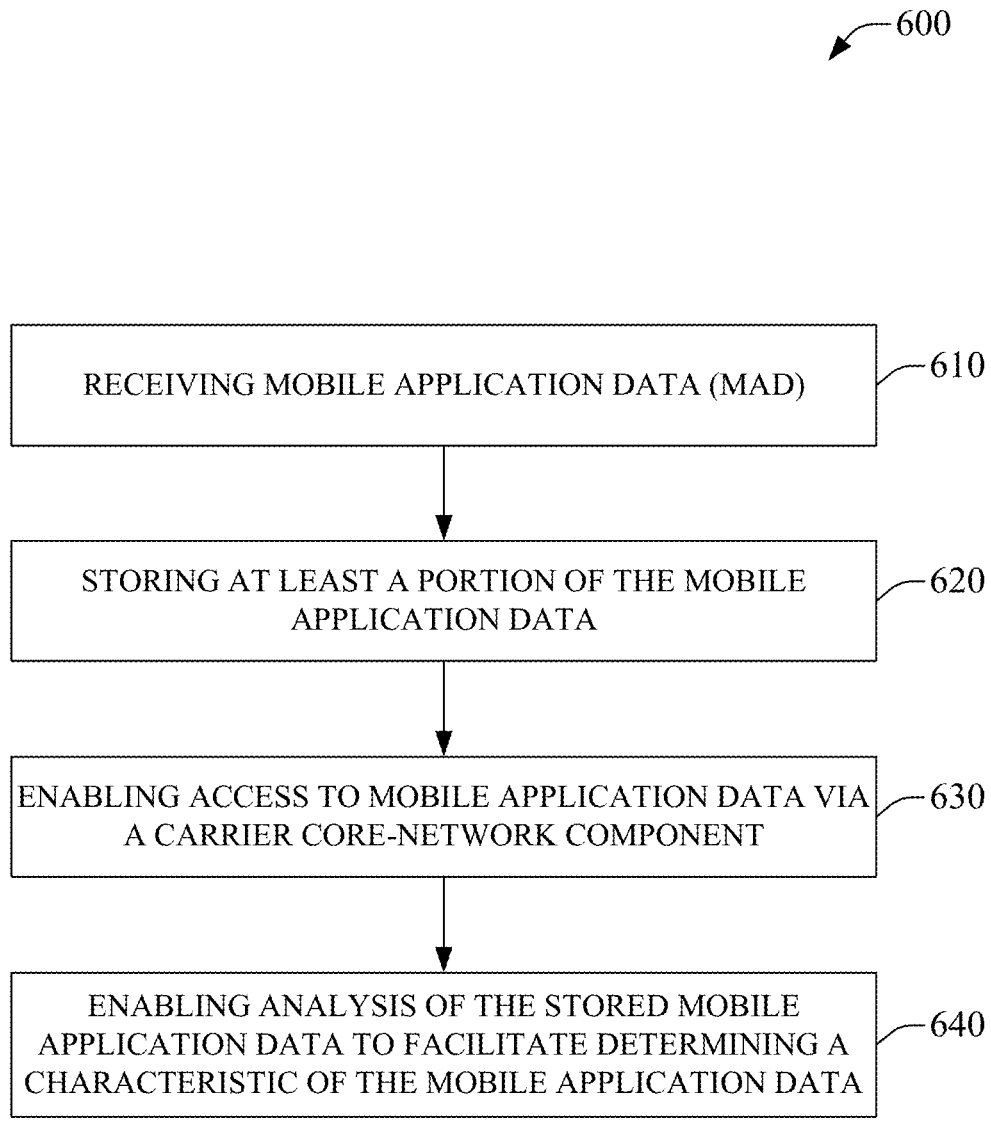
FIG. 6 illustrates an example method facilitating mobile application data capture and analysis in accordance with aspects of the subject disclosure.
Figure 7:
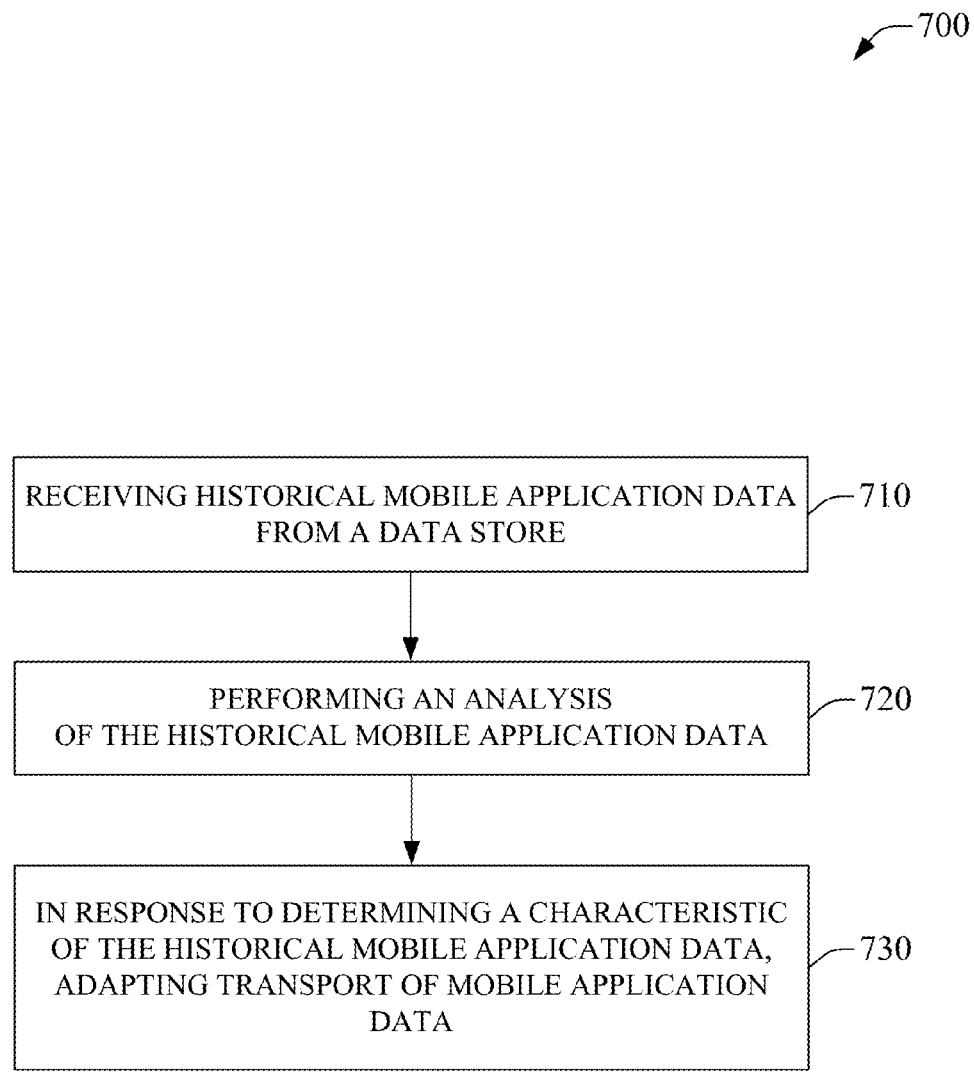
FIG. 7 depicts an example method facilitating analysis of historical data related to a mobile application in accordance with aspects of the subject disclosure.
Figure 8:
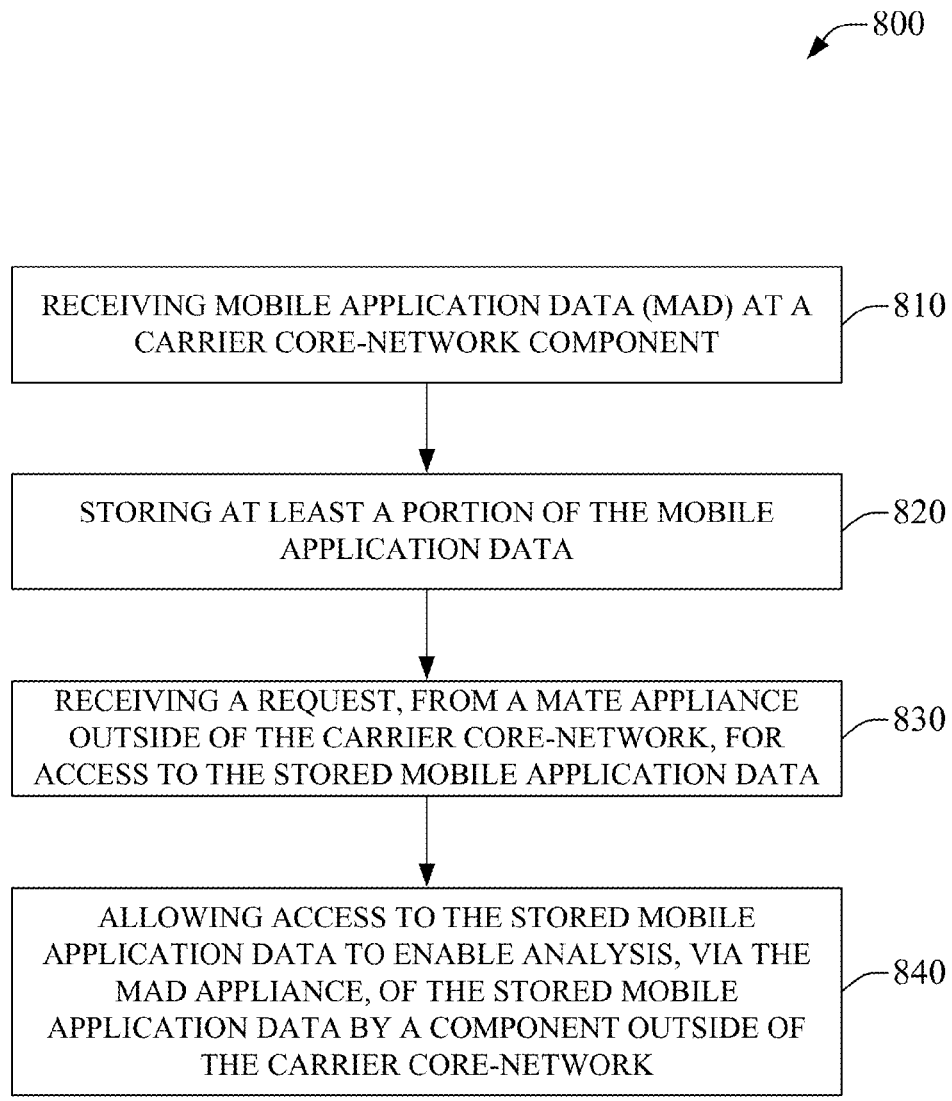
FIG. 8 illustrates an example method facilitating access to captured mobile application data for devices outside of a carrier core-network in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates a method 600 facilitating mobile application data capture and analysis in accordance with aspects of the subject disclosure. At 610, method 600 can comprise receiving mobile application data (MAD). MAD can comprise data sent by a mobile application and data sent to a mobile application. In some aspects, MAD can further comprise information related to a device executing a mobile application, an OS, network transport information, e.g., hops, devices/software, latency, throughput, availability, alternate routes, etc., application service information, etc.

At 620, method 600 can comprise, storing at least a portion of the MAD received at 610. In an aspect, storage of MAD, or related/supplementary information, can be in addition to passing MAD through the carrier core-network to an application service or returning application service data back to a mobile application via the carrier core-network. In some embodiments, some, none, or all of the MAD can be stored. In some embodiments, some, none, or all of the related/supplementary information can be stored. MAD and/or related information can be stored on a local data storage device, a remotely located data storage device, on a cloud-network implemented storage component, etc.

At 630, method 600 can enable access to the MAD, facsimiles of the MAD, or an adapted version of the MAD, via a carrier core-network component. In an embodiment, access to the MAD can be from a data store via the carrier core-network component. In other embodiments, access to the MAD can be directed through the carrier core-network component while permitting storage of a copy of the MAD. In further embodiments, access to adapted MAD, e.g., as in a testing or simulation process, etc., can be directed through the carrier core-network component directly or from a data store.

Method 600, at 640, can comprise enabling analysis of the stored MAD, supplementary information, etc., to facilitate determining a characteristic of the MAD. At this point, method 600 can end. Analysis can reveal trends, patterns, characteristics, behaviors, etc., associated with a mobile application, such as discovering communication bottlenecks for MAD traversing a carrier core-network, a RAN, other networks, etc., determining alternate paths that can be associated with different latency, throughput, or service availability, etc., identifying issues associated with the mobile application and devices, hardware, software, operating systems, etc., or nearly any other aspect related to the mobile application. Analysis, in some embodiments, can be based on header information for data packets that comprise MAD both to and from an application service, e.g., via an application service component.

In certain embodiments, a system performing method 600 can comprise a component in communication with a carrier core-network device, or can be comprised in a carrier core-network device, e.g., a gateway, router, switch, etc. Furthermore, a system performing method 600 can be in communication with devices or components outside of the carrier core-network, such as an application service device, a mobile device, a RAN device, other networking devices, servers, etc., that can facilitate capture of information that is supplementary to MAD, for example, RAN hardware or software configuration information, location information, application service component OS information, network path location/device/software information, etc., can be captured in addition to, or as part of, MAD.

FIG. 7 illustrates a method 700 that facilitates analysis of historical data related to a mobile application in accordance with aspects of the subject disclosure. At 710, method 700 can comprise receiving historical MAD from a data store device. In an embodiment, the data store device can be located local to, or as part of, a carrier core-network component. In another embodiment, the data store device can be located remotely and be coupled to a carrier core-network component via a wired and/or wireless connection, e.g., the Internet, etc. In an embodiment, historical MAD can comprise data generated by a mobile application in execution, data sent to a mobile application, or supplementary data related to execution of the mobile application or transport of data to, or from, the mobile application.

At 720, an analysis of the historical MAD can be performed by method 700. Analysis can reveal trends, patterns, characteristics, behaviors, etc., associated with a mobile application, such as discovering communication characteristics for MAD traversing a carrier core-network, a RAN, other networks, etc., determining data communication paths that can be associated with different latency, throughput, or service availability, etc., identifying issues associated with the mobile application and devices, hardware, software, operating systems, etc., or nearly any other aspect related to the mobile application. Analysis, in some embodiments, can be based on header information for data packets that comprise MAD, both to and from an application service.

At 730, transport of MAD can be adapted in response to determining a characteristic of the historical MAD at 720. At this point method 700 can end. Adapting the transport can comprise, in some embodiments, altering latency, throughput, or service availability, for the MAD data as it traverses a carrier core-network. In some embodiments, adapting can comprise selecting another transport path between a mobile device executing a mobile application and an application service component. Embodiments can also comprise testing and/or simulation via adapting the transport, e.g., where a carrier core-network component interrupts communication between a mobile application in execution and an application service by altering the MAD or substituting MAD to test either, or both, the mobile application or application service under a different transport permutations.

FIG. 8 illustrates a method 800 that facilitates access to captured mobile application data for devices outside of a carrier core-network in accordance with aspects of the subject disclosure. At 810, method 800 can comprise receiving MAD at a carrier-core network component. MAD can comprise data sent by a mobile application and data sent to a mobile application. In some aspects, MAD can further comprise information related to a device executing a mobile application, an OS, network transport information, e.g., hops, devices/software, latency, throughput, availability, alternate routes, etc., application service information, etc.

At 820, method 800 can comprise, storing at least a portion of the MAD at a data storage device. The data store device can be located local to, or as part of, the carrier core-network component. In another embodiment, the data store device can be located remotely and be coupled to the carrier core-network component via a wired and/or wireless connection. In an embodiment, MAD can comprise data generated by a mobile application in execution, data sent to a mobile application, or supplementary data related to execution of the mobile application or transport of data to, or from, the mobile application.

At 830, a request for access to the stored MAD can be received from a MATE appliance, e.g., 221, 421-423, etc. A MATE appliance can receive integrated and correlated records related to MAD, and communicate with a carrier core-network component, e.g., MATE component 120, 420, etc., in a secure manner in order to request further information, to receive data analytics, etc., and the MATE component can collect and correlate mobile application and mobile device data, store these data in extremely large data repositories that reside either within the carrier network or in the cloud, etc. In some embodiments, the request for access to the stored MAD can be received from a MATE appliance of the carrier network, of another carrier network, of an enterprise private network, of an application service provider, etc.

At 840, access to the stored MAD can be allowed to enable analysis of the stored MAD data, by a device connected with the MATE appliance. At this point method 800 can end. In an aspect, the device connected to the MATE appliance can be external to the carrier core-network. As an example, an application service provider can analyze stored MAD data received via a MATE appliance, to better understand or test performance of a mobile application that transports data to/from the mobile application via the carrier core-network. In an aspect, access to data can be controlled, e.g., by the carrier via access rules, subscription agreements, related laws and policies, etc., to protect private data, limit access to sensitive data, quash unfair competition, etc., as will be appreciated by those familiar with the relevant arts.

Figure 9:
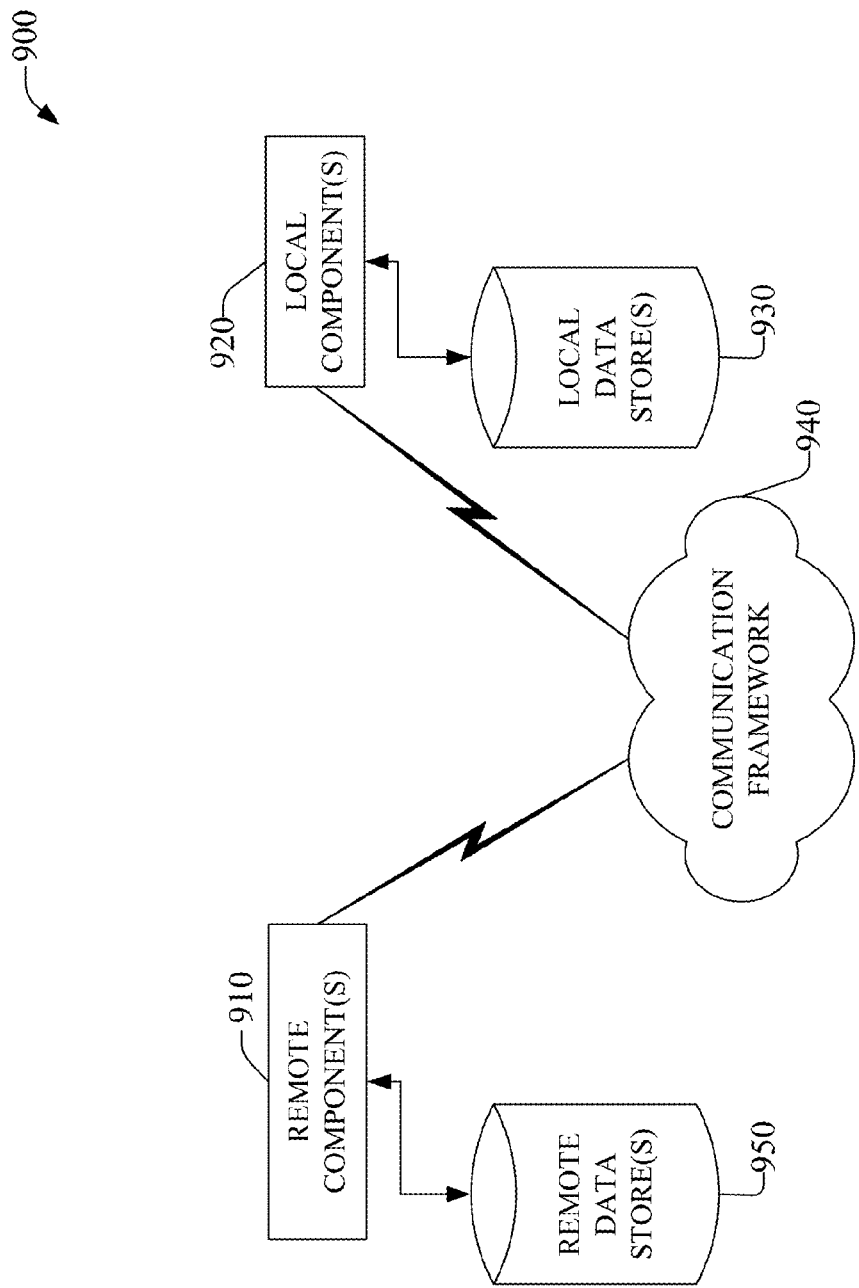
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise servers, personal servers, wireless telecommunication network devices, etc. As an example, remote component(s) 910 can be mobile device 204, RAN 206, application service component 294, 494, etc., other carrier core-network component 209, 409, etc., MATE data subscriber access component 470, MATE data publication component 472, etc.

The system 900 also comprises one or more local component(s) 920. The local component(s) 920 can be hardware and/or software (e.g., threads, processes, computing devices). In some embodiments, local component(s) 920 can comprise, for example, carrier core-network component 208, 308, 408, etc., MATE component 120, 220A, 220B, 220C, 320, 420, 520, etc., carrier core-network data path 562, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network. Remote component(s) 910 can be operably connected to one or more remote data store(s) 950, such as a hard drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
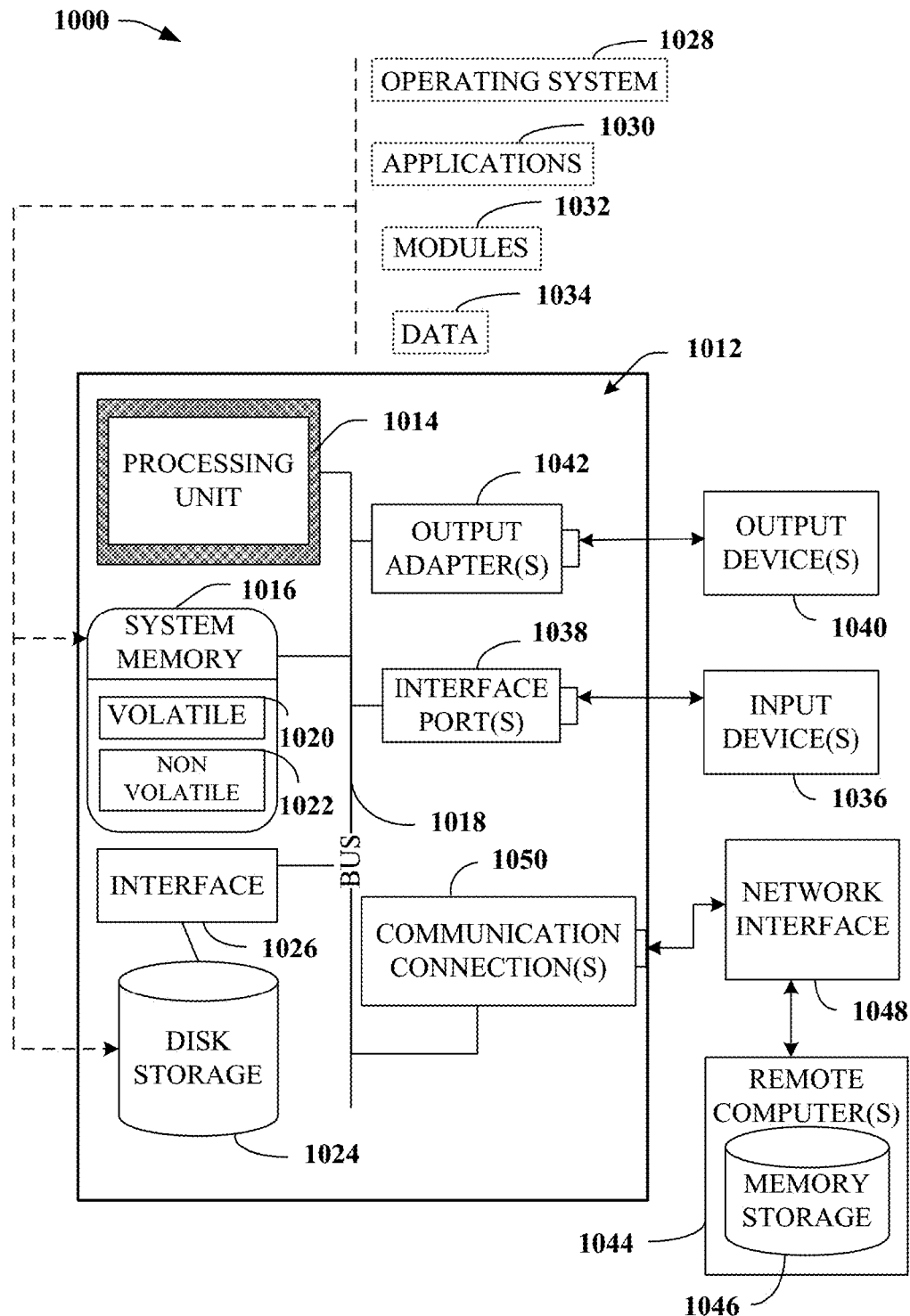
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, carrier core-network component 208, 308, 408, etc., MATE component 120, 220A, 220B, 220C, 320, 420, 520, etc., carrier core-network data path 562, etc., mobile device 204, RAN 206, application service component 294, 494, etc., other carrier core-network component 209, 409, etc., MATE data subscriber access component 470, MATE data publication component 472, etc., comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: receiving trigger information a remote device, e.g., a UE, and in response, generating communication augmentation information that can be accessed via an air interface or other wireless interface by one or more service interface components or other UEs to enable context sensitive communication augmentation.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse input GUI, a command line controlled interface, etc., allowing a user to interact with computer 1012. As an example, mobile device 204, application service component 294, 494, etc., can receive touch, motion, audio, visual, or other types of input. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A carrier core-network device, comprising:
   a processor; and
   a memory that stores executable instructions that, when executed by the processor, facilitate performance of operations, comprising:
      receiving, from a mobile device via a radio access network device, mobile application data from a mobile application operating on the mobile device, wherein a characteristic of the mobile application data traversing carrier core-network devices of a carrier core-network is captured by the carrier core-network device;
      determining a transport path for transport of the mobile application data;
      adapting a topology of the transport path based on the characteristic captured by the carrier core-network device resulting in an adapted topology, wherein the topology comprises a connection between nodes of the transport path; and
      adjusting, based on the adapted topology, the transport of the mobile application data.

2. The carrier core-network device of claim 1, wherein the adapting the topology is based on adjusting a latency associated with the transport of the mobile application data.

3. The carrier core-network device of claim 1, wherein the adapting the topology is based on adjusting a throughput associated with the transport of the mobile application data.

4. The carrier core-network device of claim 1, wherein the adapting the topology comprises adjusting an availability of a service associated with the transport of the mobile application data.

5. The carrier core-network device of claim 1, wherein the adapting the topology is based on a historical value of a property of the topology of the transport path.

6. The carrier core-network device of claim 1, wherein the adapting the topology comprises adapting the topology of network devices of a network of a carrier associated with the carrier core-network device, and wherein the mobile device is communicatively coupled to the network of the carrier via the radio access network device.

7. The carrier core-network device of claim 1, wherein a first topology of first network devices of a first network of a first carrier is associated with the carrier core-network device, and wherein the adapting the topology comprises adapting a second topology of second network devices of a second network of a second carrier communicatively coupled to the carrier core-network device.

8. The carrier core-network device of claim 1, wherein the determining the transport path is based on historical mobile application data received from a data storage device.

9. The carrier core-network device of claim 1, wherein the receiving the mobile application data and the determining the transport path are performed via a network service of a network device communicatively coupled to the carrier core-network device.

10. The carrier core-network device of claim 1, wherein the operations further comprise adapting a parameter associated with operating the mobile application on the mobile device based on determining a characteristic associated with the mobile application from the mobile application data.

11. The carrier core-network device of claim 1, wherein the adapting the topology comprises adapting a radio access network path between the mobile device and the carrier core-network device.

12. The carrier core-network device of claim 11, wherein the mobile application data comprises first information related to a mobile application execution environment for the mobile application and second information related to the transport of the mobile application data to the carrier core-network device.

13. A method, comprising:
   receiving, by a device comprising a processor, mobile application data, via a radio access network device, wherein the mobile application data is related to a mobile application operating on a mobile device and wherein a characteristic of the mobile application data traversing carrier core-network devices of a carrier core-network is captured by the device;
   determining, by the device, a transport path for transport of the mobile application data;
   adapting, by the device, a topology of the transport path based on the characteristic, wherein the topology comprises an internodal connection between nodes comprised by the transport path; and
   based on the adapting the topology, adjusting, by the device, the transport of the mobile application data.

14. The method of claim 13, wherein the adapting the topology of the transport path comprises adapting a latency associated with the transport of the mobile application data.

15. The method of claim 13, wherein the adapting the topology of the transport path comprises adapting a throughput associated with the transport of the mobile application data.

16. The method of claim 13, wherein the adapting the topology of the transport path comprises adapting an availability of a service associated with the transport of the mobile application data.

17. A non-transitory machine-readable storage device, comprising executable instructions that, when executed by a processor, facilitate performance of operations, comprising:
   receiving, via a radio access network device, mobile application data related to a mobile application operating on a mobile device, wherein the mobile application data comprises a characteristic determined by a carrier core-network device, and wherein the characteristic corresponds to the mobile application data traversing carrier core-network devices of a carrier core-network;

determining a transport path to transport the mobile application data via interconnected nodes of the transport path; and in response to altering a topology of the transport path based on the characteristic, adapting the transport of the mobile application data.

18. The non-transitory machine-readable storage device of claim 17, wherein the altering the topology of the transport path comprises adaptation of a latency associated with the transport of the mobile application data.

19. The non-transitory machine-readable storage device of claim 17, wherein the altering the topology of the transport path comprises adaptation of a throughput associated with the transport of the mobile application data.

20. The non-transitory machine-readable storage device of claim 17, wherein the altering the topology of the transport path comprises adaptation of an availability of a service associated with the transport of the mobile application data.

* * * * *